(12) United States Patent
Hakkani-Tur et al.

(10) Patent No.: US 7,835,910 B1
(45) Date of Patent: Nov. 16, 2010

(54) EXPLOITING UNLABELED UTTERANCES FOR SPOKEN LANGUAGE UNDERSTANDING

(75) Inventors: Dilek Z. Hakkani-Tur, Parsippany, NJ (US); Gokhan Tur, Parsippany, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 1560 days.

(21) Appl. No.: 10/448,415

(22) Filed: May 29, 2003

(51) Int. Cl.
*G10L 15/00* (2006.01)

(52) U.S. Cl. .......................... 704/243; 704/10; 704/251
(58) Field of Classification Search ............... 704/10, 704/243, 251
See application file for complete search history.

(56) References Cited

U.S. PATENT DOCUMENTS

| | | | | |
|---|---|---|---|---|
| 6,009,392 | A * | 12/1999 | Kanevsky et al. | 704/245 |
| 6,038,535 | A * | 3/2000 | Campbell | 704/275 |
| 6,205,426 | B1 * | 3/2001 | Nguyen et al. | 704/255 |
| 6,397,181 | B1 * | 5/2002 | Li et al. | 704/256.4 |
| 6,442,519 | B1 * | 8/2002 | Kanevsky et al. | 704/243 |
| 6,571,210 | B2 * | 5/2003 | Hon et al. | 704/251 |
| 6,799,162 | B1 * | 9/2004 | Goronzy et al. | 704/244 |
| 6,839,671 | B2 * | 1/2005 | Attwater et al. | 704/255 |
| 7,006,972 | B2 * | 2/2006 | Hwang | 704/244 |
| 7,092,888 | B1 * | 8/2006 | McCarthy et al. | 704/277 |
| 7,280,965 | B1 * | 10/2007 | Begeja et al. | 704/257 |
| 7,328,146 | B1 * | 2/2008 | Alshawi et al. | 704/1 |
| 2002/0095295 | A1 * | 7/2002 | Cohen et al. | 704/275 |
| 2003/0091163 | A1 * | 5/2003 | Attwater et al. | 379/88.01 |
| 2004/0205482 | A1 * | 10/2004 | Basu et al. | 715/500.1 |
| 2006/0149558 | A1 * | 7/2006 | Kahn et al. | 704/278 |
| 2008/0270130 | A1 * | 10/2008 | Alonso et al. | 704/236 |

OTHER PUBLICATIONS

Rabiner et al., Fundamentals of Speech Recognition, 1993 by AT&T, p. 171.*
A. L. Gorin, A. Abella, T. Alonso, G. Riccardi, and J. H. Wright, "Automated Natural Spoken Dialog," *IEEE Computer Magazine*, vol. 35, No. 4, pp. 51-56, Apr. 2002.
A. L. Gorin, G. Riccardi, and J. H. Wright, "How May I Help You?," Speech Communication, 1997.
A. Blum and T. Mitchell, "Combining Labeled and Unlabeled Data with Co-Training," in *Proceedings of the Workshop on Computational Learning Theory (COLT)*, Madison, WI, Jul. 1998.
K. Nigam, A. McCallum, S. Thrun, and T. Mitchell, "Text Classification from Labeled and Unlabeled Documents Using EM," *Machine Learning*, vol. 39, No. 2/3, pp. 103-134, 2000.
R. Ghani, "Combining Labeled and Unlabeled Data for Multiclass Text Categorization," in *Proceedings of the ICML*, Sydney, Australia, Jul. 2002.

(Continued)

*Primary Examiner*—Daniel D Abebe

(57) ABSTRACT

A system and method for exploiting unlabeled utterances in the augmentation of a classifier model is disclosed. In one embodiment, a classifier is initially trained using a labeled set of utterances. Another set of utterances is then selected from an available set of unlabeled utterances. In one embodiment, this selection process can be based on a confidence score threshold. The trained classifier is then augmented using the selected set of unlabeled utterances.

17 Claims, 6 Drawing Sheets

OTHER PUBLICATIONS

D. Lewis and J. Catlett, "Heterogeneous Uncertainty Sampling for Supervised Learning," in *Proceedings of the ICML.*, New Brunswick, NJ, Jul. 1994.

G. Tur, R. Schapire, D. Hakkani-Tur, "Active Learning for Automatic Speech Recognition," in *Proceedings of the ICASSP*, Orlando, FL, May 2002.

R. Schapire, M. Rochery, M. Rahim, and N. Gupta, "Incorporating Prior Knowledge into Boosting," *Proceedings of the ICML*, Jul. 2002.

R. Schapire and Y. Singer, "BoosTexter: A Boosting-Based System for Text Categorization," *Machine Learning*, vol. 39, No. 2/3, pp. 135-168, 2000.

* cited by examiner

EXPLOITING UNLABELED UTTERANCES FOR SPOKEN LANGUAGE UNDERSTANDING

BACKGROUND

1. Field of the Invention

The present invention relates generally to spoken language understanding and more particularly to exploiting unlabeled utterances for spoken language understanding.

2. Introduction

Voice-based natural dialog systems enable customers to express what they want in spoken natural language. Such systems automatically extract the meaning from speech input and act upon what people actually say, in contrast to what one would like them to say, shifting the burden from the users to the machine. In a natural language spoken dialog system, identifying the speaker's intent can be seen as a general classification problem. Once the speaker's intent is determined, the natural language spoken dialog system can take actions accordingly to satisfy their request.

In a natural language spoken dialog system, the speaker's utterance is recognized first using an automatic speech recognizer component. Then, the intent of the speaker is identified (or classified) from the recognized speech sequence, using a natural language understanding component.

This classification process can be seen as a general classification problem. In one example, this classification problem is applied to call routing. In this call classification example, consider the utterance "I would like to learn my account balance" in a customer-care application. Assuming that the utterance is recognized correctly, the corresponding intent or the calltype would be Account Balance Request and the action would be prompting the balance to the user or routing this call to the billing department.

When statistical classifiers are employed, they are trained using large amounts of task data, which is transcribed and labeled by humans. This transcription and labeling process is a very expensive and laborious process. By "labeling," we mean assigning one or more predefined classification types to each utterance. It is clear that the bottleneck in building an accurate statistical system is the time spent for high-quality labeling. What is needed therefore is the ability to build better statistical classification systems in a shorter time frame.

SUMMARY

The principles of the present invention satisfy the above-mentioned needs by enabling the exploitation of unlabeled utterances in the augmentation of a classifier model. In one embodiment, a classifier is initially trained using a labeled set of utterances. Another set of utterances is then selected from an available set of unlabeled utterances. In one embodiment, this selection process can be based on a confidence score threshold. The trained classifier is then augmented using the selected set of unlabeled utterances.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The process of assigning one or more classification types (e.g., calltypes) to individual utterances is a very expensive and laborious process. The costs both in human capital and in delays in the delivery of new or improved products are critical factors that can impede success in a competitive environment. What is needed is the ability to build better classification systems in a shorter time frame.

State of the art spoken language understanding (SLU) systems are trained using labeled utterances. Typically, only a small portion of the available utterance data is labeled for use in the training process. The remaining utterance data is left unlabeled and is largely ignored. In typical applications, there exists some amount of labeled data and relatively larger chunks of unlabeled data.

As a point of reference, a typical natural language spoken dialog system can produce about two million utterances a month. Of these two million utterances, maybe 20,000 of those utterances would be selected for labeling and training. The remaining utterance data, which in this example represents 99% of the utterance data, is typically left unused. Even assuming that a significant portion of the remaining utterance data would be useful for training purposes, the amount of effort required for manually labeling those additional utterances would be enormously prohibitive to even consider.

It is a feature of the present invention that the unlabeled utterance data can be exploited in the classifier training process to augment existing classifier models in a natural language spoken dialog system. This additional training can be embodied as a semi-supervised learning process, thereby helping to eliminate some of the costs incurred in the generation of a classifier that can perform at a particular desired classification error rate. In that regard, results have indicated that the same classification performance can be obtained by using 30% less labeled data when the unlabeled data is utilized. This corresponds to a 1-1.5% absolute classification error rate reduction, using the same amount of labeled utterance data.

Figure 1:
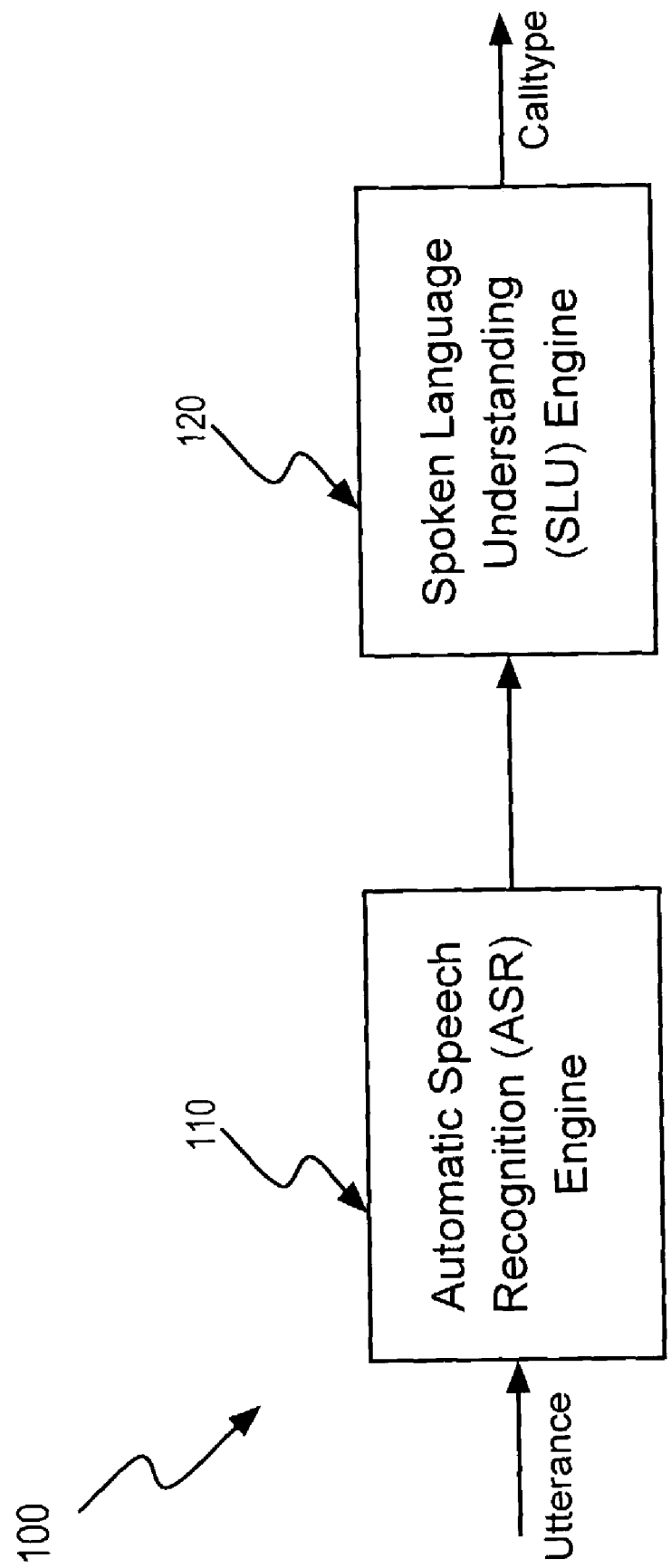
FIG. 1 illustrates a general architecture of a natural language spoken dialog system.

A general architecture of a natural language spoken dialog system is illustrated in FIG. 1. As illustrated, natural language spoken dialog system 100 includes a large vocabulary automatic speech recognition (ASR) engine 110 that relies on one or more knowledge sources (e.g., acoustic and language models) to extract words from user speech. Natural language spoken dialog system 100 also includes a spoken language understanding (SLU) engine 120 that is operative to extract meaning from the output of ASR engine 110 and classify customer requests. For example, SLU engine 120 can be designed to classify input telephone calls into various calltypes (or classes), such as Billing Credit, Calling Plans, etc. An embodiment of a natural language spoken dialog system 100 is exemplified by AT&T's How May I Help You (HMIHY) natural dialog system.

In natural language spoken dialog system 100, a constant stream of raw utterance data is collected from the field. A portion of this raw utterance data, or utterance data derived from the raw utterance data, can be used to augment SLU engine 120.

One of the goals of the present invention is to enable the exploitation of the unlabeled utterances in a semi-supervised fashion. In this process, it is assumed that there is some amount of training data available for training an initial classifier. This initially trained classifier can be used to label the unlabeled utterance data automatically and to improve the classifier performance using the machine-labeled classification-types as the labels of those unlabeled utterances. This process enables the reduction in the amount of human-labeling effort necessary to generate a decent statistical system.

Figure 2:
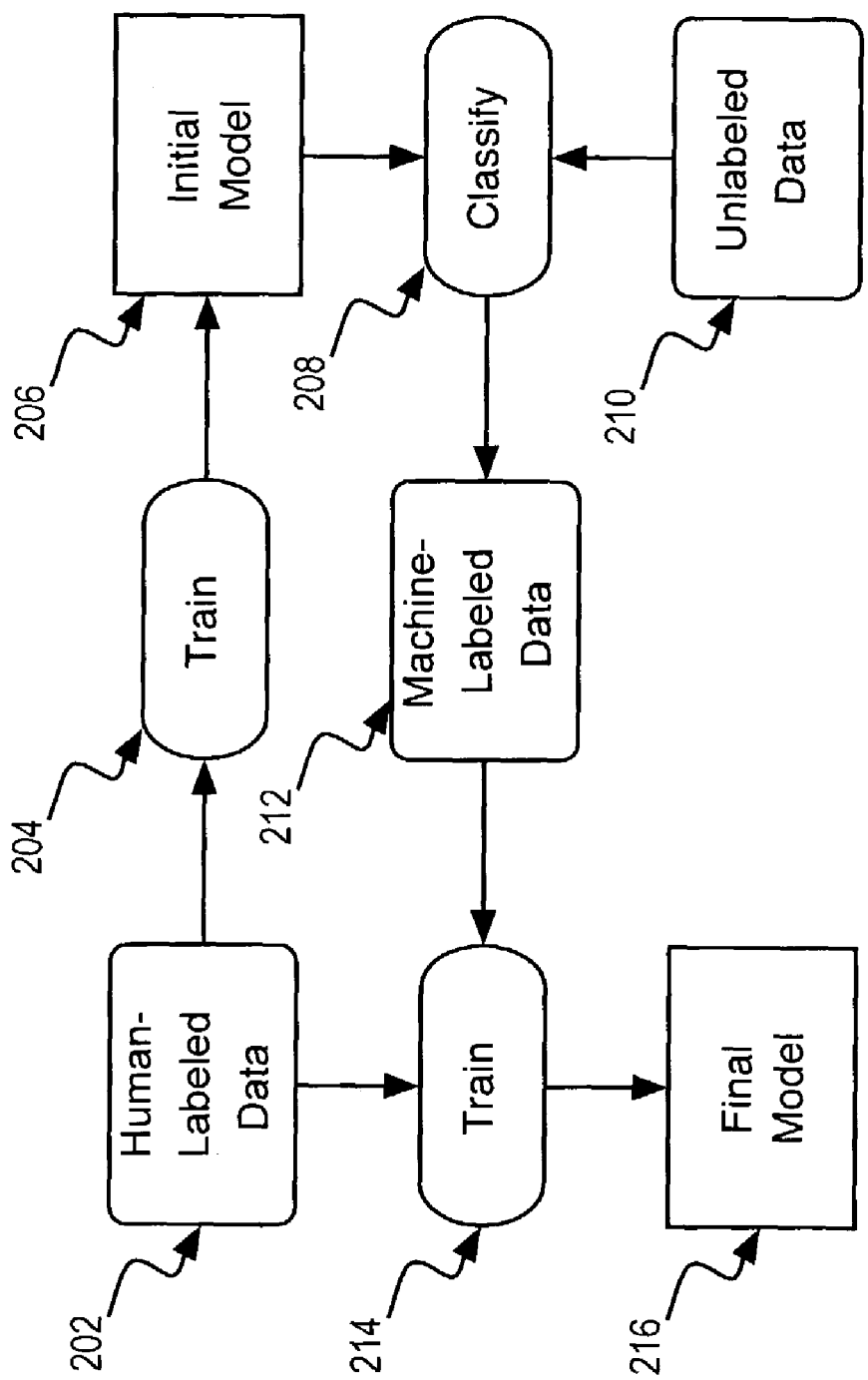
FIG. 2 illustrates an exemplary method for augmenting training data according to the present invention.

One approach for exploiting the machine-labeled utterances is to simply add those utterances to the training data. FIG. 2 illustrates the process for generating a classifier model using both human-labeled and machine-labeled utterance data.

As illustrated, the process begins using human-labeled data 202. Human-labeled data 202 is used in training step 204 to produce initial model 206. Initial model 206 is then used in classification step 208 to classify unlabeled data 210. This step produces machine-labeled data 212. Machine-labeled data 212 is then added to the existing training data represented by human-labeled data 202.

In one embodiment, noise added because of classifier errors can be reduced through the addition of only those utterances that are classified with classification-types having a confidence score higher than some threshold. This threshold can be set using a separate held-out set of data.

The combination of machine-labeled data 212 and human-labeled data 202 can then be used in training step 214 to train the classifier again to produce final model 216.

Figure 3:
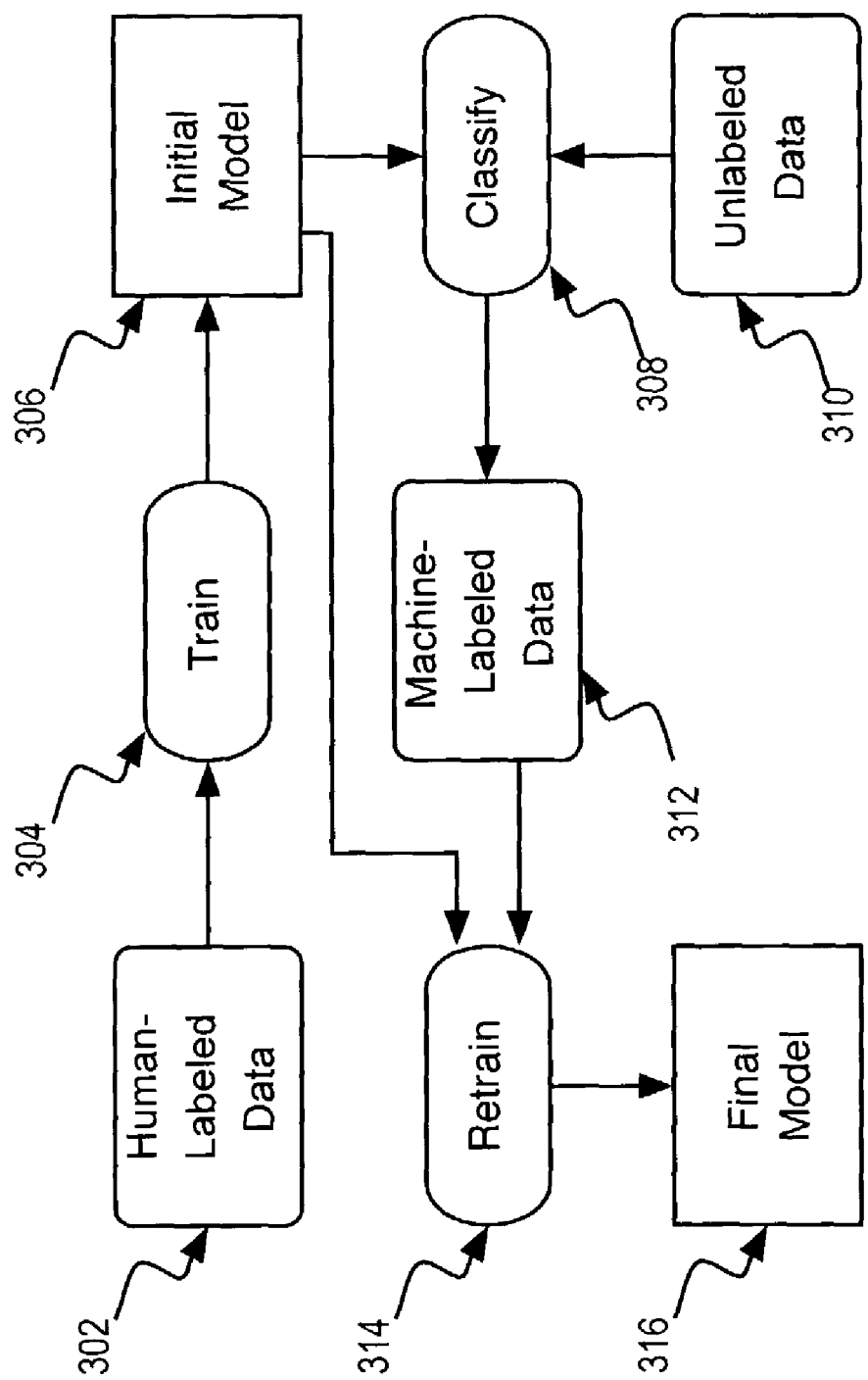
FIG. 3 illustrates an exemplary method for augmenting a classification model.

In a second approach, the unlabeled utterance data is used to augment the classification model by incorporating unlabeled examples in a weighted manner. This approach is described below with reference to the illustration of FIG. 3.

As illustrated, the process begins using human-labeled data 302. Human-labeled data 302 is used in training step 304 to produce initial model 306. Initial model 306 is then used in classification step 308 to classify unlabeled data 310. This step produces machine-labeled data 312. Machine-labeled data 312 is then used in step 314 to retrain initial model 306 to produce final model 316.

In one embodiment, only the utterances having classifier confidence scores greater than a particular threshold are selected for use in retraining step 314.

In an alternative embodiment, the portion of the unlabeled utterances that is selected for use in augmenting the trained classifier is generated after a set of unlabeled utterances are chosen for manual labeling. In one embodiment, the unlabeled utterances are chosen based on an active learning process that seeks to reduce the labeling effort by selectively sampling a set of unlabeled utterances. Selectively sampling the utterances assumes that there is a pool of candidate utterances to label, which is much more than the capacity of the labelers. In a deployed natural language spoken dialog system, this is indeed the case, where a constant stream of raw data is collected from the field.

One of the aims of active learning is to identify a small subset of all utterances collected from the field for labeling. This small subset of utterances would represent those utterances that are different enough for the classifier, and hence are believed to significantly enhance the training of the classifier. In one embodiment, this subset of utterances would be identified by low classification confidence scores. These manually labeled utterances would then be used to train the classifier.

Figure 4:
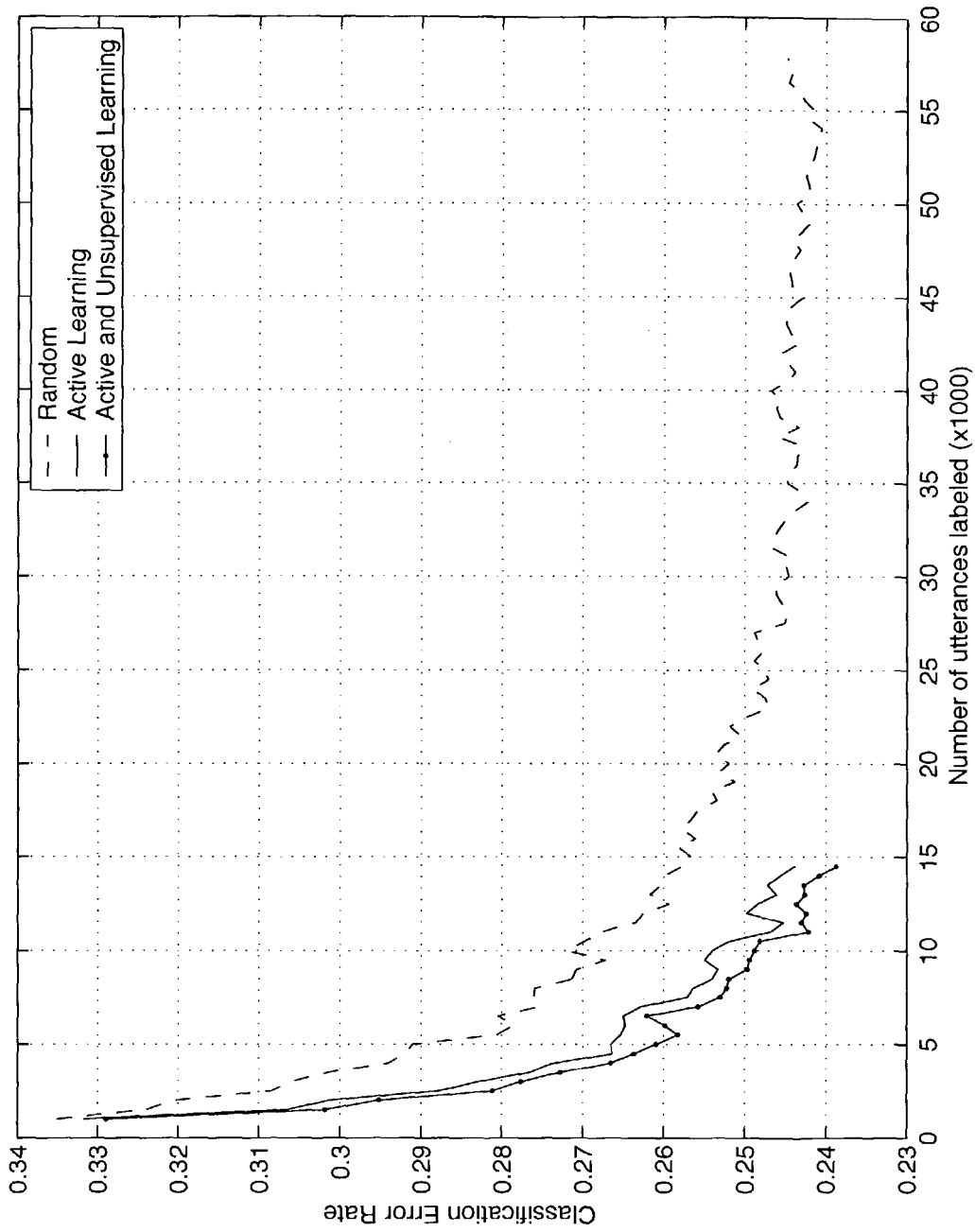
FIG. 4 illustrates the effect on classification error rate using active learning and unsupervised learning.

The remaining utterances that were not selected for manual labeling could then be selected for augmenting the classifier model in an unsupervised manner. In effect, the remainder of the unlabeled utterance data represents the result of using the same confidence score threshold as that used to identify the lower range of confidence scores. As would be appreciated, distinct confidence score threshold values can also be used. FIG. 4 illustrates the classification error rate using active and unsupervised learning.

In one embodiment, the retraining process is based on a boosting process, which incorporates prior knowledge. Here, the goal is to train a model that fits both human-labeled data 302 and machine-labeled data 312. After the initial model is trained using human-labeled data 302, the boosting algorithm then tries to fit both machine-labeled data 312 and the prior model using a loss function.

In general, a boosting algorithm aims to combine "weak" base classifiers to come up with a "strong" classifier. This is an iterative algorithm, and in each iteration, a weak classifier is learned so as to minimize the training error.

More formally, the algorithm (for the simplified binary (+1 and −1) classification case) can operate as follows:

Given the training data from the instance space X:

$(x_i, y_i), \ldots, (x_m, y_m)$ where $x \in X$ and $y_i \in -1, +1$

Initialize the distribution $D_1(i)=1/m$

For each iteration $t=1, \ldots, T$ do

Train a base learner, $h_t$, using distribution $D_t$.

Update $D_{t+1}(i)=D_t(i)e^{-\alpha_t y_i h_t(x_i)}/Z_t$ where Z is a normalization factor and $\alpha_t$ is the weight of the base learner.

Then the output of the final classifier is defined as:

$H(x)=\text{sign}(f(x))$ where $$f(x) = \sum_{t=1}^{T} \alpha_t h_t(x)$$

This algorithm can be seen as a procedure for finding a linear combination of base classifiers which attempts to minimize a loss function. In one embodiment, the loss function is:

$$\sum_i e^{-y_i f(x_i)}$$

An alternative embodiment could be based on minimizing logistic loss, which is:

$$\sum_i \ln(1 + e^{-y_i f(x_i)})$$

A more detailed explanation and analysis of a boosting algorithm can be found in R. E. Schapire, "The Boosting Approach to Machine Learning: An Overview," in *Proceedings of the MSRI Workshop on Nonlinear Estimation and Classification,* 2002, which is incorporated herein by reference in its entirety.

In a further embodiment, the boo sting algorithm can be designed to attempt to fit both machine-labeled data 312 and the prior model using the following loss function:

$$\sum_i (\ln(1 + e^{-y_i f(x_i)}) + \eta KL(P(.|x_i)\|\rho(f(x_i))))$$

where $$KL(p\|q) = p\ln(p/q) + (1-p)\ln((1-p)/(1-q))$$

is the Kullback-Leibler divergence (or binary relative entropy) between two probability distributions p and q. In the present case, they correspond to the distribution from the prior model, $P(.|x_i)$, to the distribution from the constructed model, $\rho(f(x_i))$. This term is basically the distance from the initial model built by human-labeled data 302 and the new model 316 built with machine-labeled data 312. In the marginal case, if these two distributions are always the same then the KL term will be 0 and the loss function will be exactly the same as the first term, which is nothing but the logistic loss. $\eta$ is used to control the relative importance of these two terms. This weight may be determined empirically on a held-out set. In addition, similar to the first approach illustrated in FIG. 2, in order to reduce the noise added because of classifier errors, only those utterances which are classified with a confidence higher than some threshold are exploited.

These semi-supervised learning methods have been evaluated using the utterances from the database of the HMIHY system. In this natural language spoken dialog system, users are asking questions about their phone bills, calling plans, etc., and the system aims to classify them into one or more of the 49 calltypes in total, such as Account Balance Request, Calling Plans, etc. There are 57,829 utterances in the training data, 3,500 utterances in the held-out set, and 3,513 utterances in the test set. All of them were transcribed. The tests were performed using the BoosTexter tool, which is described in R. E. Schapire and Y. Singer, "BoosTexter: A Boosting-Based System for Text Categorization," *Machine Learning,* Vol. 39, No. 2/3, pp. 135-168, 2000, which is incorporated herein by reference in its entirety. All experiments used word n-grams as features and iterated 500 times.

Figure 5:
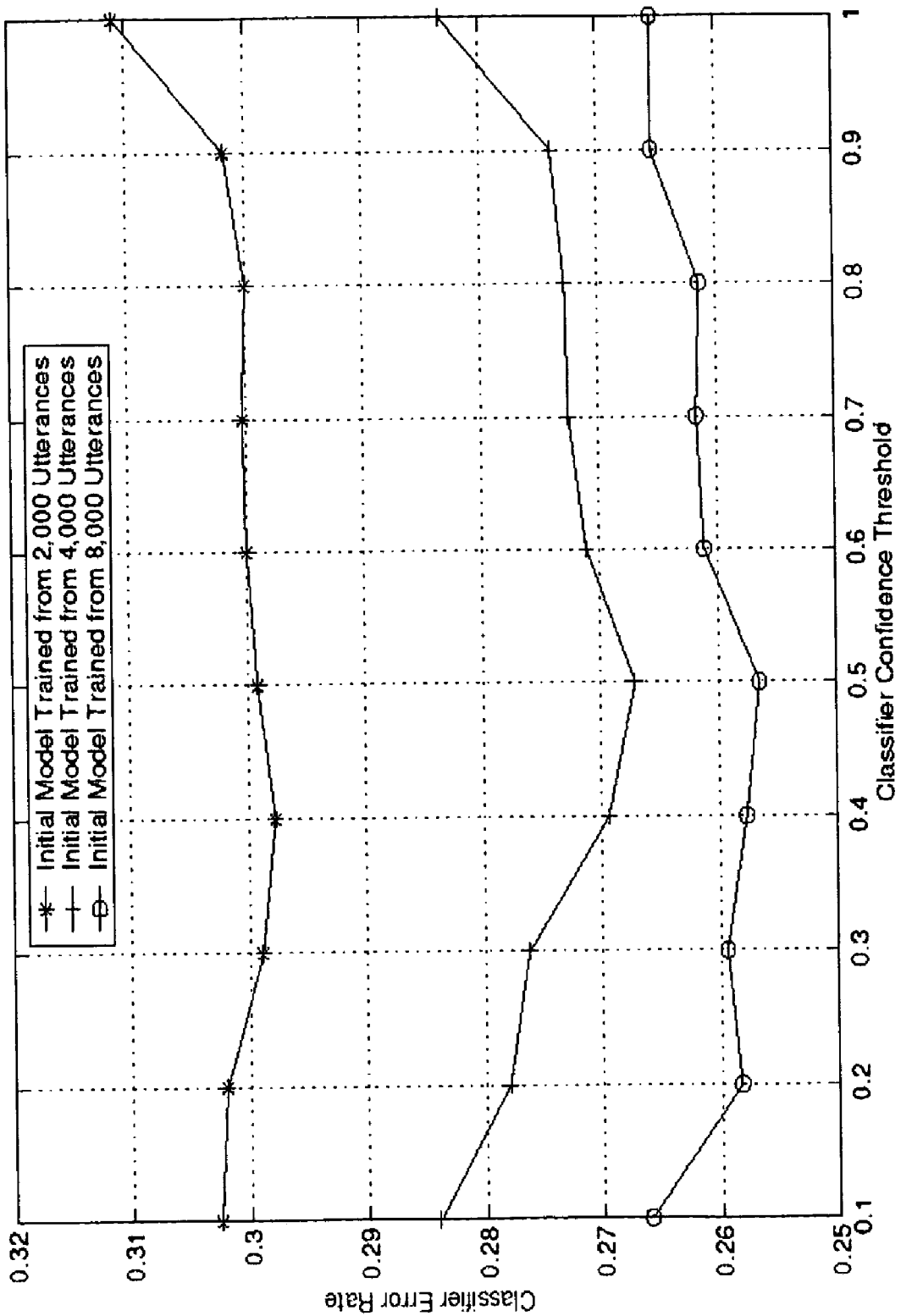
FIG. 5 illustrates the trade-off for choosing the threshold to select among the machine-labeled data on the held-out set.

First, the optimal threshold of top scoring calltype confidences was selected using the held-out set. Obviously, there is a trade-off in selecting the threshold. If it is set to a lower value, that means a larger amount of noisy data; and if it is set to a higher value, that means less amount of useful or informative data. FIG. 5 proves this behavior for the held-out set. Initial models were trained using 2,000, 4,000, and 8,000 human-labeled utterances and then those models were augmented, as described in the first approach, with the remaining data (only using machine-labeled calltypes).

The x-axis identifies different thresholds to select from the unlabeled data which the classifier uses, and the y-axis identifies the classification error rate if that data is also exploited. Classification error rate is the ratio of utterances for which the classifier's top scoring calltype is not one of the correct labels. A threshold of 0 means using all the machine-labeled data and 1 means using none of the machine-labeled data. As illustrated, there is consistently a 1-1.5% difference in classification error rates using various thresholds for each data size.

Figure 6:
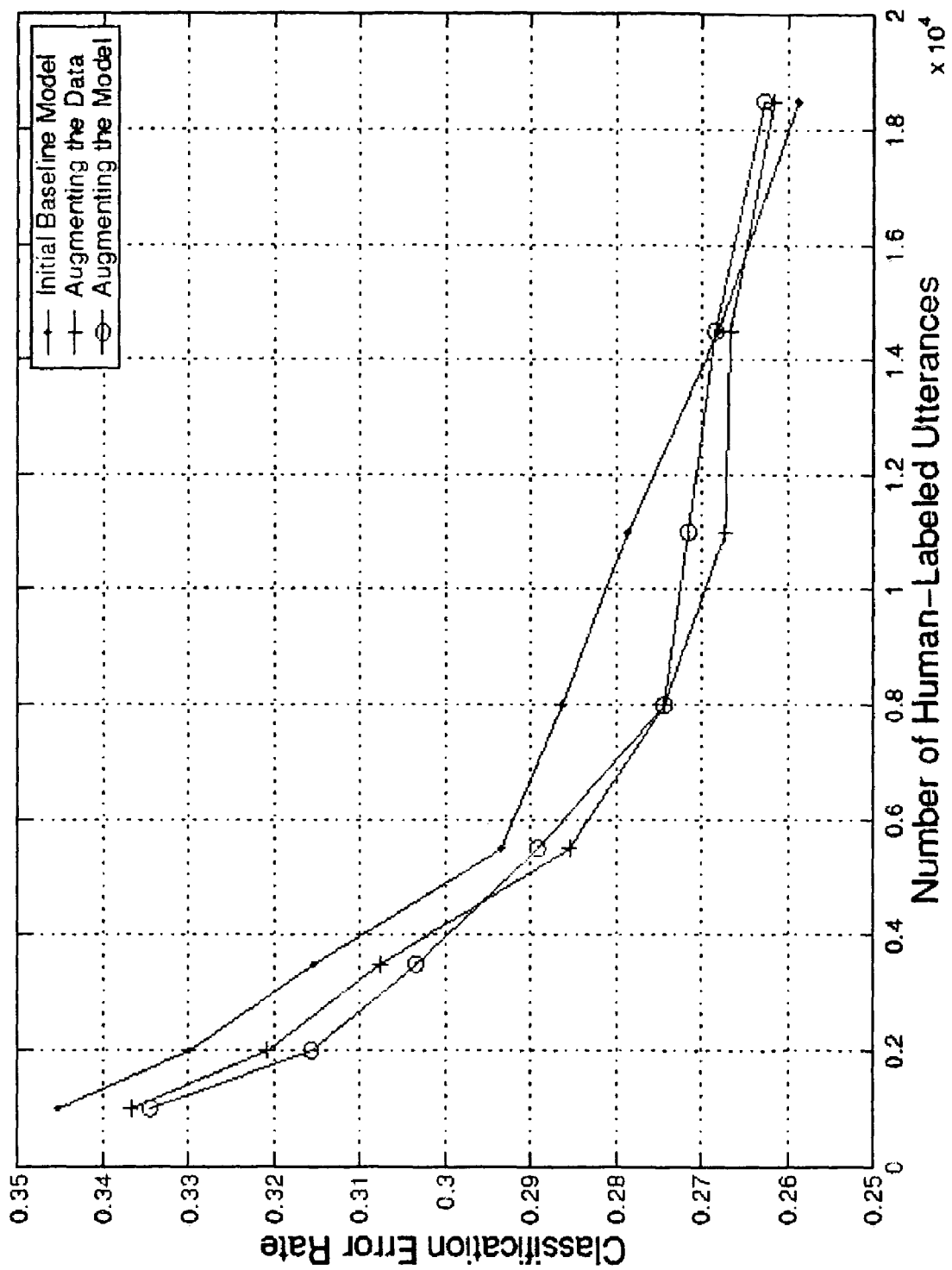
FIG. 6 illustrates the effect on classification error rate using a method of the present invention.

FIG. 6 depicts the performance using the two approaches described above, by plotting the learning curves for various initial labeled data set sizes. As illustrated, the x-axis is the amount of human-labeled training utterances, and the y-axis is the classification error rate of the corresponding model on the test set. The baseline is the top curve, with the highest error rate, where no machine-labeled data is used. The two curves below the baseline are obtained by the two proposed approaches. In both approaches, 0.5 was selected as the threshold for selecting machine-labeled data; and for each data size, the weight $\eta$ was optimized in the second approach using the held-out set. As in the case of the held-out set, a 1-1.5% classifier error rate reduction was consistently obtained on the test set using both approaches when the labeled training data size is less than 15,000 utterances. The reduction in the need for human-labeled data to achieve the same classification performance is around 30%. For example the same performance was obtained when 5,000 human-labeled utterances were used instead of 8,000 if the data was augmented with un-labeled utterance data.

As described above, methods have been presented for exploiting the unlabeled speech utterances, which are confidently classified by the classifier. It has been shown that, for the task of call classification, using these semi-supervised learning methods, it is possible to improve the performance of a spoken language understanding system. These techniques can be used by any general classifier, which supports a way of combining models or augmenting the existing model. Significantly, these results indicate that the same call classification accuracy can be achieved using 30% less labeled data when there is not much training data available.

The challenge with semi-supervised learning is that only the utterances which are classified with a confidence larger than some threshold may be exploited in order to reduce the noise introduced by the classifier errors. Intuitively, the noise introduced would be less with better initial models; but in such a case, additional data will be less useful. It is therefore possible that such semi-supervised techniques would be less efficient when working with very little or very large amounts of data. An alternative approach for using a threshold to select machine-labeled data would be modifying the classifier so that, at each iteration, the confidence of the calltypes contribute to the data distribution.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or a combination thereof) to a computer, the computer properly views the connection as a computer-readable medium. When a "tangible" computer-readable medium is recited, it is limited to a hardware medium such as a random access memory, read-only memory, hard disk and the like and expressly excludes software per se in a wireless communication connection. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the preferred embodiments of the invention may be described with reference to a SLU component within a spoken dialog system. However, the invention may have applicability in a variety of environments where SLU may be used. Therefore, the invention is not limited to SLU within any particular application. Accordingly, the appended claims and their legal equivalents only should define the invention, rather than any specific examples given.

What is claimed is:

1. A method for training a speech classifier in a spoken language understanding system using an available set of utterances associated with a single kind of information, the available set of utterances including a first labeled part and a second unlabeled part, the method comprising:
   (1) training via a processor a speech classifier for a spoken language understanding system with the first labeled part of the available set of utterances;
   (2) selecting via the processor a portion of the second unlabeled part of the available set of utterances; and
   (3) augmenting via the processor the trained speech classifier with the selected portion of the second unlabeled part of the available set of utterances, wherein the augmenting further comprises minimizing a loss function.

2. The method of claim 1, wherein said training comprises training the speech classifier with the first labeled part of the available set of utterances, wherein said first labeled part includes utterances that have been labeled manually.

3. The method of claim 1, wherein said selecting comprises selecting a portion of the second unlabeled part of the available set of utterances based on confidence scores.

4. The method of claim 3, wherein said selecting comprises selecting a portion of the second unlabeled part of the available set of utterances based on confidence scores that are greater than a threshold value.

5. The method of claim 3, wherein the first labeled part of the available set of utterances are selected based on confidence scores that are less than a threshold value, and wherein said selecting comprises selecting the remaining portion of the available set of utterances after the first labeled part of the available set of utterances is identified.

6. The method of claim 1, wherein said augmenting comprises augmenting the trained speech classifier with the selected portion of the second unlabeled part of the available set of utterances in a weighted manner.

7. The method of claim 1, wherein the loss function further comprises:

$$\sum_i (\ln(1 + e^{-y_i f(x_i)}) + \eta KL(P(.|x_i) \| \rho(f(x_i))))$$

where $$KL(p\|q) = p \ln(p/q) + (1-p)\ln((1-p)/(1-q))$$

is the Kullback-Leibler divergence between two probability distributions p and q, which correspond to the distribution from a prior model, $P(.|x_i)$, and the distribution from a constructed model, $\rho(f(x_i))$, respectively.

8. An unsupervised learning method for training a speech classifier in a spoken language understanding system from a single kind of information, the method comprising:
   (1) receiving a collection of unlabeled utterance data that has been collected by a natural language dialog system;
   (2) generating confidence values for the received collection of unlabeled utterance data;
   (3) assembling a group of utterances from the received collection of unlabeled utterance data that has a confidence value indicative of usefulness in augmenting the speech classifier; and
   (4) augmenting the speech classifier with the assembled group of utterances, wherein the augmenting further comprises minimizing a loss function.

9. The method of claim 8, wherein said receiving comprises receiving raw utterance data.

10. The method of claim 8, wherein said assembling comprises assembling a group of utterances from the received collection of unlabeled utterance data that has a confidence value greater than a threshold value.

11. The method of claim 8, further comprising identifying a set of utterances that are candidates for manual labeling, wherein said assembling comprises assembling the remainder of the received collection of unlabeled utterance data that has not been identified for manual labeling.

12. The method of claim 8, wherein said augmenting comprises augmenting the speech classifier with the assembled group of utterances in a weighted manner.

13. The method of claim 8, wherein the loss function further comprises:

$$\sum_i (\ln(1 + e^{-y_i f(x_i)}) + \eta KL(P(.\,|\,x_i) \| \rho(f(x_i))))$$

where $$KL(p\|q) = p\ln(p/q) + (1-p)\ln((1-p)/(1-q))$$

is the Kullback-Leibler divergence between two probability distributions p and q, which correspond to the distribution from a prior model, $P(.|x_i)$, and the distribution from a constructed model, $\rho(f(x_i))$, respectively.

14. A tangible computer-readable medium that stores instructions for controlling a computer device to train a speech classifier in a spoken language understanding system using an available set of utterances associated with a single kind of information, the available set of utterances including a first labeled part and a second unlabeled part, the instructions comprising:
 (1) training a speech classifier for a spoken language understanding system with the first labeled part of the available set of utterances;
 (2) selecting a portion of the second unlabeled part of the available set of utterances; and
 (3) augmenting the trained speech classifier with the selected portion of the second unlabeled part of the available set of utterances, wherein the augmenting further comprises minimizing a loss function.

15. A tangible computer-readable medium that stores instructions for controlling a computer device to train a speech classifier for a natural language dialog system using utterances associated with a single kind of information, the instructions comprising:
 (1) receiving a collection of unlabeled utterance data that has been collected by a natural language dialog system;
 (2) generating confidence values for the received collection of unlabeled utterance data;
 (3) assembling a group of utterances from the received collection of unlabeled utterance data that has a confidence value indicative of usefulness in augmenting the speech classifier; and
 (4) augmenting the speech classifier with the assembled group of utterances, wherein the augmenting further comprises minimizing a loss function.

16. A spoken language understanding module that uses a method for training a speech classifier using an available set of utterances associated with a single kind of information, the available set of utterances including a first labeled part and a second unlabeled part, the method comprising:
 (1) training a speech classifier for a spoken language understanding module with the first labeled part of the available set of utterances;
 (2) selecting a portion of the second unlabeled part of the available set of utterances; and
 (3) augmenting the trained speech classifier with the selected portion of the second unlabeled part of the available set of utterances, wherein the augmenting further comprises minimizing a loss function.

17. A spoken language understanding module that uses an unsupervised learning method for training a speech classifier from utterances associated with a single kind of information, the method comprising:
 (1) receiving a collection of unlabeled utterance data that has been collected by a natural language dialog system;
 (2) generating confidence values for the received collection of unlabeled utterance data;
 (3) assembling a group of utterances from the received collection of unlabeled utterance data that has a confidence value indicative of usefulness in augmenting the speech classifier; and
 (4) augmenting the speech classifier with the assembled group of utterances, wherein the augmenting further comprises minimizing a loss function.

\* \* \* \* \*